United States Patent
Codella et al.

(10) Patent No.: US 10,769,691 B2
(45) Date of Patent: Sep. 8, 2020

(54) METHOD AND COMPUTER PROGRAM PRODUCT FOR AUTOMATED GENERATION AND ASSEMBLY OF PROPOSAL ELEMENTS

(71) Applicant: INTERNATIONAL BUSINESS MACHINES CORPORATION, Armonk, NY (US)

(72) Inventors: Christopher F. Codella, Marlboro, NY (US); Kevin W. Hall, Colorado Springs, CO (US); Stephen M. Leonard, Colorado Springs, CO (US); Rebecca E. Lutz, Orando, FL (US); Todd D. Robinson, Frederick, CO (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1035 days.

(21) Appl. No.: 15/157,753

(22) Filed: May 18, 2016

(65) Prior Publication Data

US 2017/0337605 A1 Nov. 23, 2017

(51) Int. Cl.
*G06Q 30/00* (2012.01)
*G06Q 30/06* (2012.01)

(52) U.S. Cl.
CPC ..... *G06Q 30/0611* (2013.01); *G06Q 30/0621* (2013.01); *G06Q 30/0623* (2013.01); *G06Q 30/0629* (2013.01)

(58) Field of Classification Search
CPC .......... G06Q 30/0611; G06Q 30/0629; G06Q 30/0623; G06Q 30/0621

(Continued)

(56) References Cited

U.S. PATENT DOCUMENTS 6,356,909 B1 * 3/2002 Spencer ................ G06F 16/958
8,666,807 B1 3/2014 Murray et al.
(Continued)

FOREIGN PATENT DOCUMENTS

WO 2015181758 12/2015

OTHER PUBLICATIONS

Moore, John. How CPQ Systems Boost Sales Automation and CRM. Jul. 30, 2013. Published by IDG Communications. (Year: 2013).*

(Continued)

*Primary Examiner* — Jeffrey A. Smith
*Assistant Examiner* — Allison G Wood
(74) *Attorney, Agent, or Firm* — Jay Wahlquist; Andrew D. Wright; Roberts Calderon Safran & Cole, P.C.

(57) ABSTRACT

A computer-implemented method comprises: generating, by a computing device, a computer-accessible corpus including evidence passage generation information; storing, by the computing device, the corpus; automatically generating, by the computing device, evidence passages that support a proposer's response to a customer's proposal request, wherein the evidence passages include a narrative identifying the proposer's capabilities to satisfy evaluation criteria in the proposal request, and wherein the narrative is based on customer-specific information, wherein the generating includes accessing and searching the corpus via an application programming interface (API); and outputting, by the computing device, the evidence passages as an electronic document that is editable via software running on a user device via a user interface.

19 Claims, 6 Drawing Sheets

(58) Field of Classification Search
USPC ....... 705/26.1–27.2, 26.4, 26.64, 26.61, 26.5
See application file for complete search history.

(56) References Cited

U.S. PATENT DOCUMENTS

| | | | | |
|---|---|---|---|---|
| 2003/0236751 | A1* | 12/2003 | Settle, III | H03H 7/40 705/51 |
| 2005/0187808 | A1* | 8/2005 | Adamson | G06Q 10/02 705/5 |
| 2009/0313067 | A1* | 12/2009 | Costa | G06Q 10/0637 705/7.36 |
| 2011/0106654 | A1 | 5/2011 | Lee et al. | |
| 2012/0072299 | A1* | 3/2012 | Sampsell | G06Q 30/0611 705/26.4 |
| 2013/0124244 | A1* | 5/2013 | Johnson | G06Q 10/0631 705/7.12 |
| 2013/0339427 | A1* | 12/2013 | Riley | H04L 67/42 709/203 |
| 2014/0101058 | A1* | 4/2014 | Castel | G06Q 10/20 705/305 |

OTHER PUBLICATIONS

Mell et al., "The NIST Definition of Cloud Computing", NIST, Special Publication 800-145, Sep. 2011, 7 pages.

\* cited by examiner

METHOD AND COMPUTER PROGRAM PRODUCT FOR AUTOMATED GENERATION AND ASSEMBLY OF PROPOSAL ELEMENTS

BACKGROUND

The present invention generally relates to the automated generation of a proposal, and more particularly, to the automated generation of evidence passages used for proposals.

Delivering effective proposals for competitive bids requires the ability to convey the best solutions that a proposer (e.g., a company or partnership) can offer, solutions that are aligned with customer needs and expectations, relevant for the customer's unique situation, differentiated from the competition, deliverable by the proposer, and cost effective. Efforts to assemble proposals are expensive, excessively consume the proposer's resources, and often fall short of delivering the best proposition for the customer. For example, an effective proposal ultimately communicates each of the various elements of the proposal in a way that is compliant, relevant, compelling/differentiated, deliverable, and effectively priced. However, on larger proposals, consistently producing effective proposals requires numerous and expensive iterations through bodies of information about the customer-expressed requirements, customer-relevant information, company and partner capability, competitive knowledge, and pricing.

SUMMARY

In an aspect of the invention, a computer-implemented method comprises: generating, by a computing device, a computer-accessible corpus including evidence passage generation information; storing, by the computing device, the corpus; automatically generating, by the computing device, evidence passages that support a proposer's response to a customer's proposal request, wherein the evidence passages include a narrative identifying the proposer's capabilities to satisfy evaluation criteria in the proposal request, and wherein the narrative is based on customer-specific information, wherein the generating includes accessing and searching the corpus via an application programming interface (API); and outputting, by the computing device, the evidence passages as an electronic document that is editable via software running on a user device via a user interface.

In an aspect of the invention, there is a computer program product for generating evidence passages. The computer program product comprises a computer readable storage medium having program instructions embodied therewith. The program instructions are executable by a computing device to cause the computing device to: generate a computer-accessible corpus including evidence passage generation information; store the corpus; access and search the corpus via an application programming interface (API); automatically generate evidence passages that support a proposer's response to a customer's proposal request based on accessing and searching the corpus; and output the evidence passages as an electronic document that is editable via software running on a user device via a user interface, wherein the evidence passages include a narrative identifying differences between the proposer's solutions to satisfy evaluation criteria in the proposal request and a competitor's expected solutions, and wherein the narrative is based on customer-specific information.

In an aspect of the invention a system comprises: a CPU, a computer readable memory and a computer readable storage medium associated with a computing device; program instructions to access and search a computer-generated and computer-accessible corpus via an application programming interface (API), wherein the corpus includes at least one of: proposer capability information, customer requirements, proposed solution information, customer information, and industry and competitor information; program instruction to generate evidence passages that support a proposer's response to a customer's proposal request based on accessing and searching the corpus, wherein the evidence passages include: evidence of compliance, evidence of relevance, evidence of substantiation, evidence of differentiation, and evidence of price competitiveness; and program instructions to output the evidence passages. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
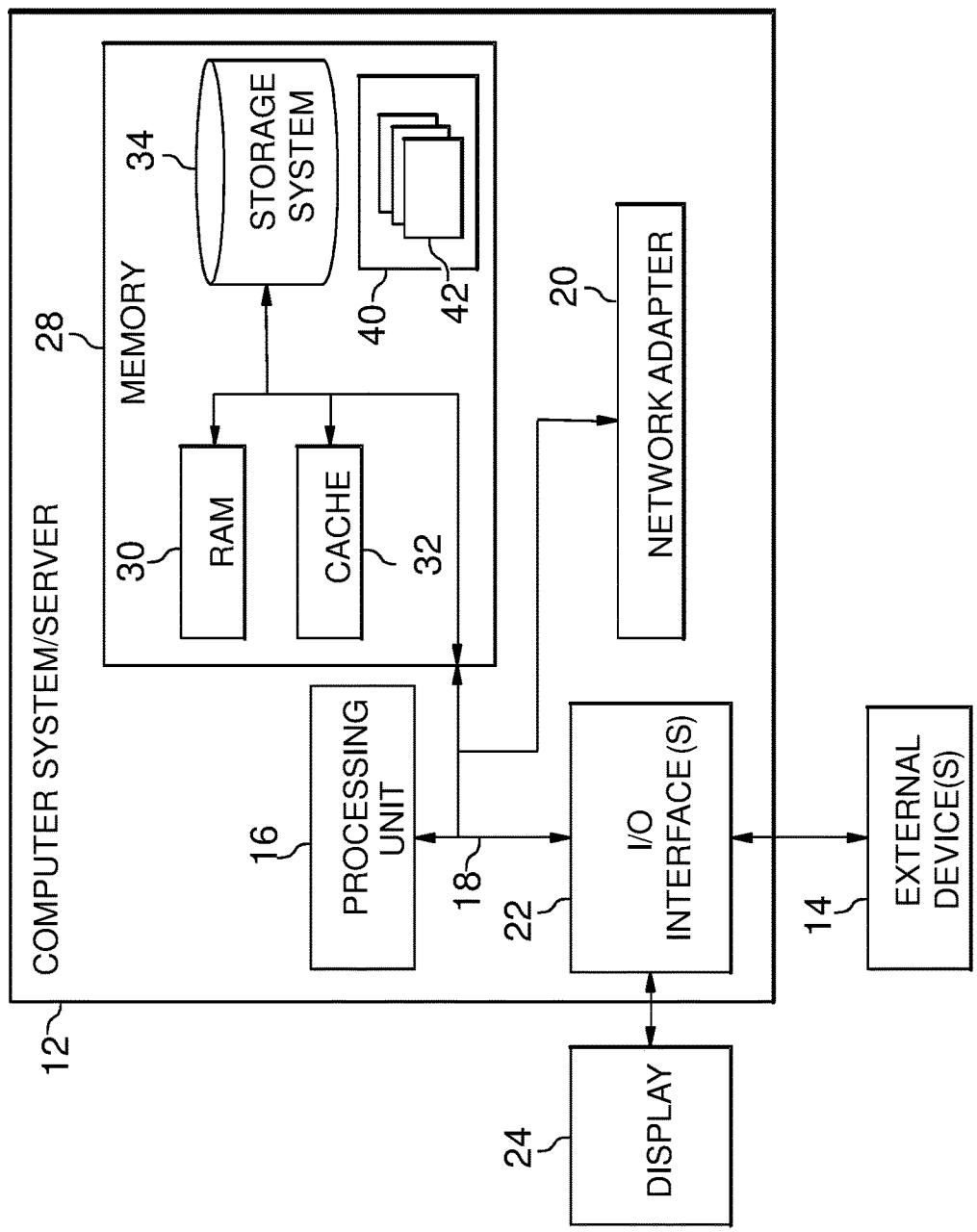
FIG. 1 depicts a cloud computing node according to an embodiment of the present invention.

The present invention generally relates to the automated generation of a proposal, and more particularly, to the automated generation of evidence passages used when constructing proposals. Aspects of the present invention may include systems and/or methods that automatically collect relevant information to aid a proposer (e.g., a company, or partnership of multiple companies) in generating a proposal (e.g., in response to a customer's request for proposal (RFP) or similar proposal or bid request). In embodiments, the systems and/or methods may assemble elements of the proposal and automatically author portions of the proposal. Advantageously, the systems and/or methods may be used to generate a proposal more efficiently, rapidly, and flexibly to produce effective proposals at a lower cost with a higher likelihood of success (e.g., improved chances of winning a bid).

As described herein, aspects of the present invention may generate, maintain, and update one or more databases (e.g., corpuses) of relevant company, customer, industry, and/or competitor information. Information in the database may be accessed to generate evidence passages that support and identify a proposer's ability to satisfy a customer's evaluation criteria (e.g., from compliance and deliverability perspectives), and the proposer's uniqueness and differentiation from competitors. Further, based on accessing the information the database, the evidence passages may be generated in a way that is customized for the customer (e.g., by incorporating the customer's communication styles, customer-specific products, jargon, acronyms, expertise, etc.). For example, as described herein, partially structured or unstructured content (e.g., text, facts, figures, etc.) relating to relevant company, customer, industry, and/or competitor information may be structured (e.g., parsed, tagged, categorized etc.), and the structured text may be stored and updated in the database. The structured information may be used to generate evidence passages in connection with a particular hypotheses query (e.g., a request to generate evidence passages supporting the satisfaction of particular evaluation criteria). In embodiments, the databases may be cloud-based and accessible via remote systems, although aspects of the invention are not so limited.

Aspects of the present invention may address a scenario in which portions of a proposal can be automatically generated when customer requirements, proposed solutions, and competition are significantly different from that of a prior proposal. For example, aspects of the present invention may identify proposal solutions in an organized fashion in which satisfaction of customer requirements, customer-specific organizational context, substantiation, and differentiation form competitor are clearly identified. As a result, quality of proposals is improved, and/or the effort for construction reduced.

As described herein, aspects of the present invention may automatically assemble elements of a proposal such that the automatically assembled elements can be used to construct relevant proposal text and other structured information, such as elements for a Bill of Materials (BoM), supporting one or more prescribed writing styles, using different kinds of inputs that combine uniquely for a given proposal, and assembled in a pre-determined outline. Evidence passages may be created in which narrative text and other prescribed artifacts (e.g. diagrams associated to information that enables their selection, images with text, graphs, charts, figures, process diagrams, etc.) for a proposal are provided based on proposal inputs. The evidence passages may more clearly, consistently, and completely convey a proposer's solution to customer evaluation criteria.

Aspects of the present invention may produce evidence passages which may be used by proposal writers. The evidence passages leverage database information to identify solutions that should be included in the proposal, with their association to customer requirements and other proposal objectives. Further, aspects of the present invention provide the opportunity to identify solutions earlier in the proposal cycle, thereby allowing for adjustments to proposal inputs or solution. Aspects of the present invention automate the generation of evidence passages to improve a proposal, thereby lowering proposal writing costs, use of expert resources, and improve the likelihood of successful contract award.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
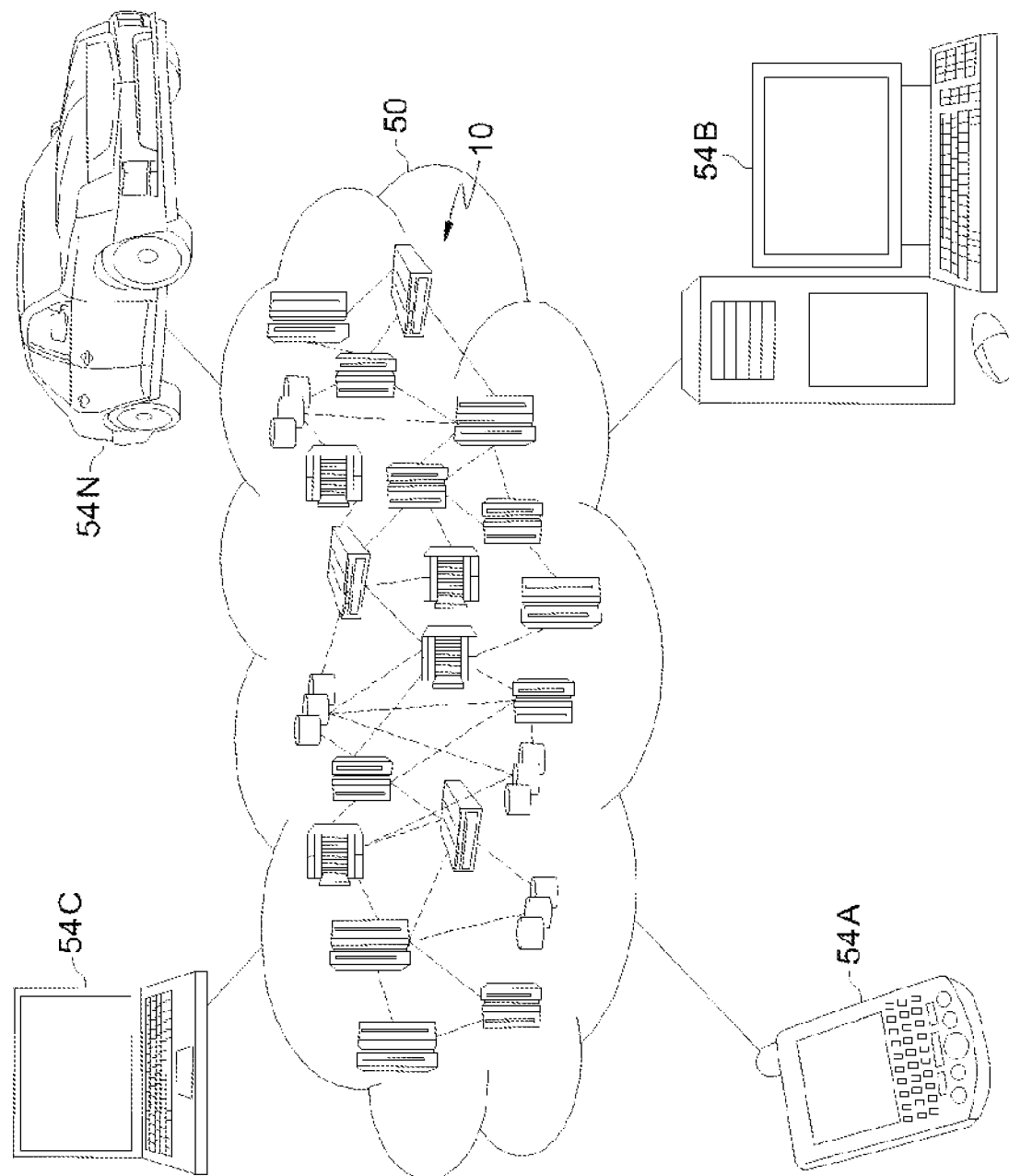
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
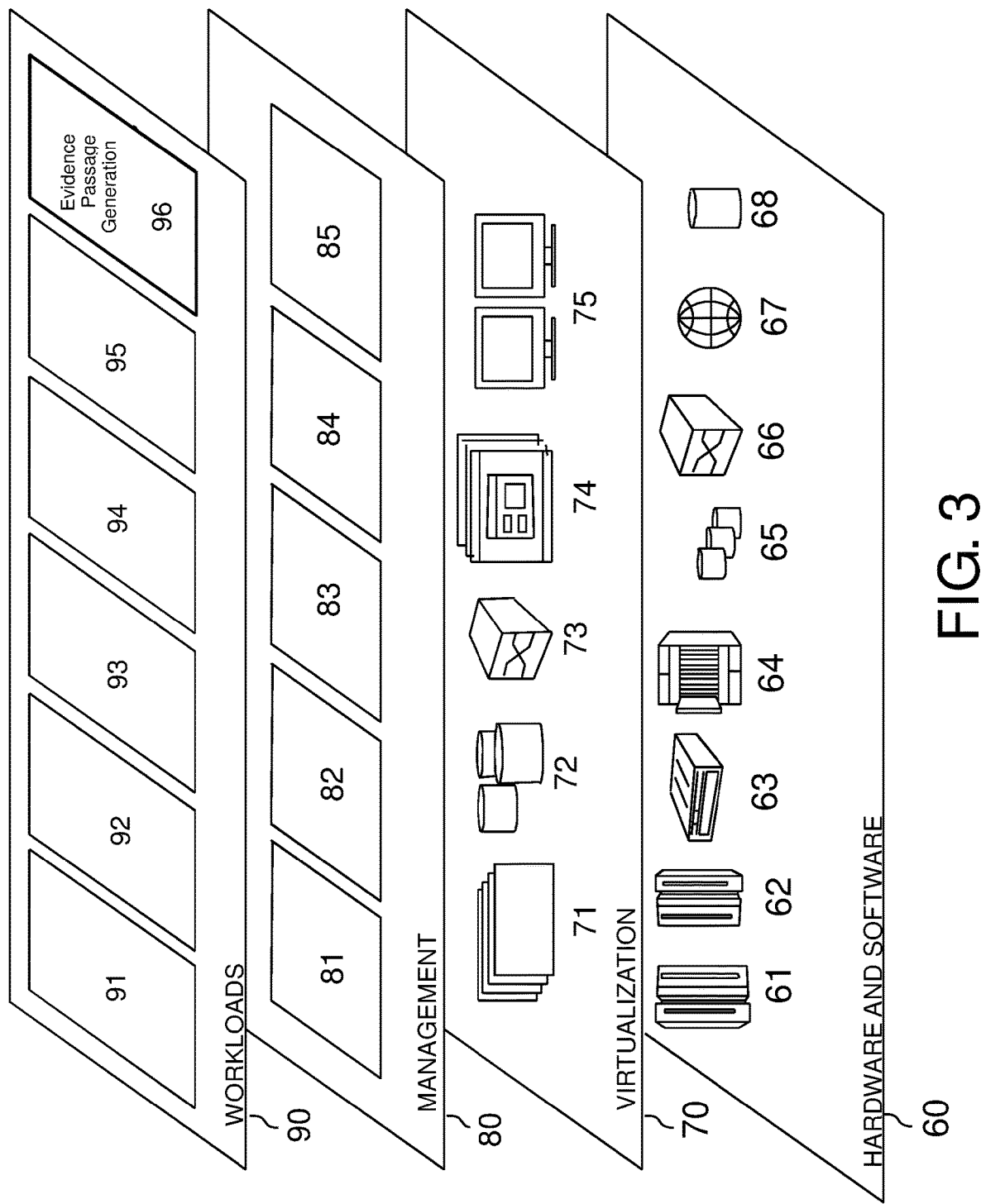
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and evidence passage generation 96.

Referring back to FIG. 1, the Program/utility 40 may include one or more program modules 42 that generally carry out the functions and/or methodologies of embodiments of the invention as described herein. The evidence passage generation 96 functionality may be performed using one or more program modules 42. Specifically, the program modules 42 may generate, maintain, and/or store one or more databases (e.g., corpuses) used to generate evidence passages. Further, the program modules 42 may generate evidence passages that support and convey a proposer's Other functionalities of the program modules 42 are described further herein such that the program modules 42 are not limited to the functions described above. Moreover, it is noted that some of the modules 42 can be implemented within the infrastructure shown in FIGS. 1-3 and in devices of subsequent FIGS.

Figure 4:
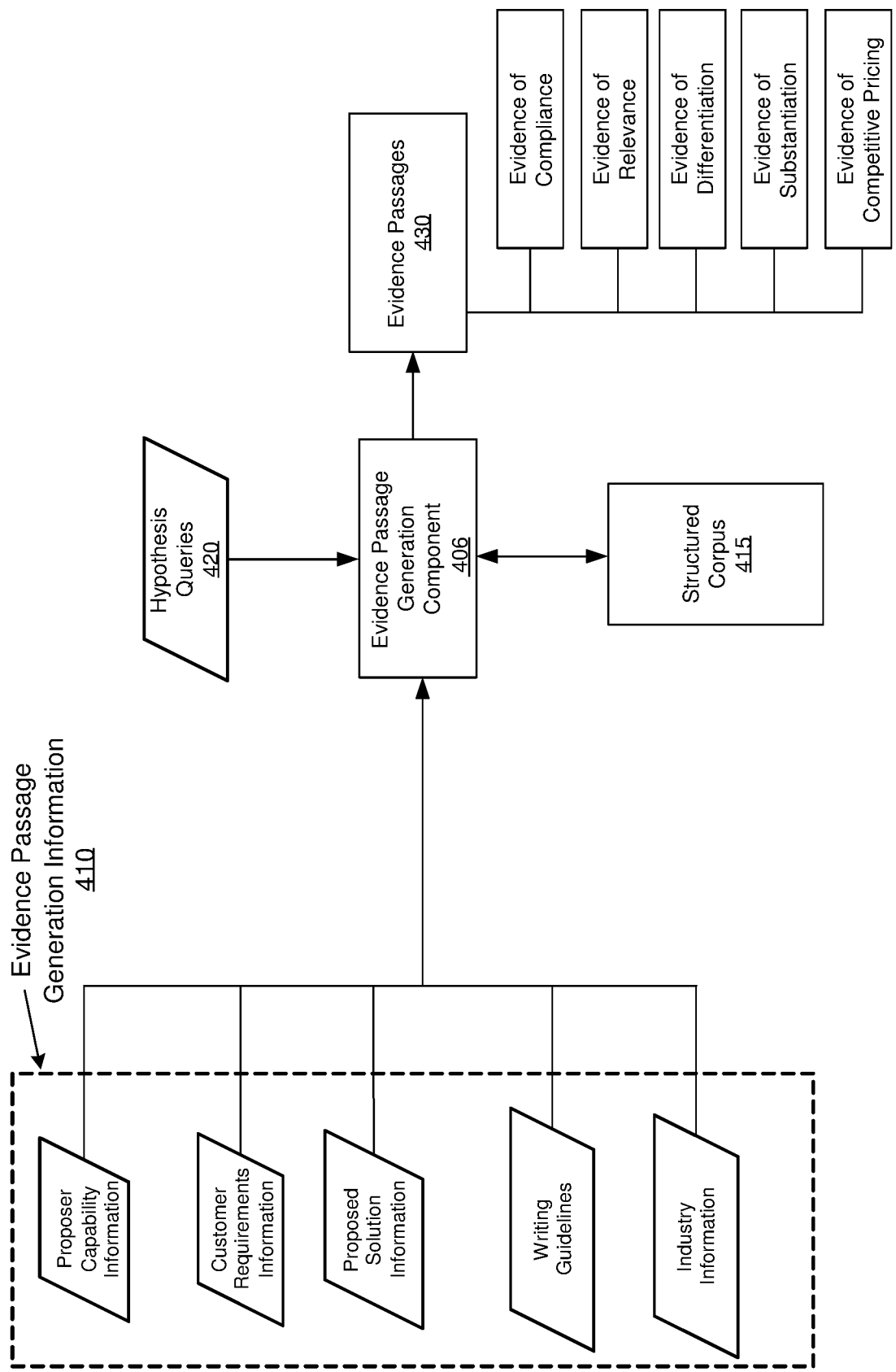
FIG. 4 shows an overview of an example implementation in accordance with aspects of the present invention.

FIG. 4 shows an overview of an example implementation in accordance with aspects of the present invention. As shown in FIG. 4, an evidence passage generation component 406 may receive evidence passage generation information 410 and hypotheses queries 420 from which evidence passages 430 are generated. For example, the evidence passage generation component 406 may comprise one or more program modules (e.g., program modules 42 of FIG. 1) that provide the functionality of evidence passage generation (e.g., evidence passage generation 96 of FIG. 3). In embodiments, evidence passage generation information 410 may generally include information regarding a proposer's capabilities, customer requirements (e.g., from a proposal request, such as an RFP or similar document), a proposer's proposed solutions, and writing guidelines for responding to the customer's proposal request. As described in greater detail with respect to FIG. 5, the evidence passage generation information 410 may be structured (e.g., parsed, tagged, categorized etc.), and the structured text may be stored, maintained, and updated in a corpus (e.g., structured corpus 415). The hypotheses query 420 includes a request to generate evidence passages relating to a particular evaluation criteria or requirement identified in the customer's proposal request document.

The evidence passages 430 may include narratives that provide evidence of a proposer's ability to satisfy the evaluation criteria. Further, the evidence passages may include narratives that provide evidence of compliance (e.g., the proposer's solution aligns with the customer's requirements), evidence of relevance (e.g., the proposer's solutions are communicated with customer-specific language and other customer-specific information), evidence of differentiation (e.g., the proposer's solution is different from the solutions of competitors), evidence of substantiation (e.g., the proposer has the resources and expertise to provide the solutions), and evidence of competitive pricing (e.g., the proposer's pricing is competitive with the expected pricing of competitor solutions). In embodiments, the evidence passages may additionally or alternatively include other content, such as images with text, graphs, charts, figures, and/or process diagrams, etc. For example, an evidence passage may include a figure, graph, or chart that illustrates evidence of compliance, relevance, differentiation, substantiation, and/or competitive pricing.

As shown in FIG. 4, the evidence passage generation information 410 may include proposer capability information, customer requirements information, proposer solution information, writing guidelines, and industry information. In embodiments, the evidence passage generation information 410 may include additional information than what is shown in FIG. 4. As described herein, the proposer capability information may identify products, solutions, and expertise of a proposer that is responding to a customer's proposal request. In general, the proposer capability information may identify the types of products, services, and/or solutions that the proposer is capable of providing (e.g., based on the proposer's previously delivered products, services, solutions, etc.). In embodiments, the proposer capability information may be obtained from external databases. Additionally, or alternatively, the proposer capability information may be received from personnel of a delivery team of the proposer.

As described herein, the customer requirements information may identify evaluation criteria that are included in a customer's RFP (or similar document). In embodiments, the customer requirements information may be obtained from external databases. Additionally, or alternatively, the customer requirements information may be received from personnel of an industry or account team of the proposer, and/or from an electronic copy of the customer's RFP. In embodiments, the customer requirements information may be used to harvest customer-specific information which may later be used to generate evidence passages including the customer-specific information (thereby leading to more customized proposal language for the customer).

As described herein, the proposed solution information may identify prior or previous solution decisions, partner capabilities, win themes, win strategies, pricing of offered products/solutions, and/or other information related to solutions associated with customer evaluation criteria. In embodiments, the proposed solution information may be obtained from external databases. Additionally, or alternatively, the proposed solution information may be received from a personnel of an opportunity or bid team of the proposer.

As described herein, writing guidelines may include customer-specific writing styles (e.g., based on customer-defined writing guidelines, writing styles found in previous proposals presented to the customer, etc.). In embodiments, the writing guidelines may be used to generate evidence passages including the customer-specific writing styles (thereby leading to more customized proposal language for the customer).

As described herein, industry information may include information regarding industry standards and/or prior solutions developed by external or competing organizations. In embodiments, the industry information may be used to differentiate between a proposer's solutions and competitor solutions to a customer's requirement. Further, generate an evidence passage 430 having evidence of relevance to highlight pricing advantages between a proposer's solution and a competitors solution.

As described herein, portions of the evidence passage generation information 410 may be manually or systematically entered by personnel of the proposer (e.g., from personnel of a delivery team of the proposer, an opportunity or bid team of the proposer, an industry/account team of the proposer, etc.) and/or suppliers to the proposed solution (e.g. partners or product vendors). For example, portions of the evidence passage generation information 410 may be manually provided via a user interface of the evidence passage generation component 406. Additionally, or alternatively, portions of the evidence passage generation information 410 may be obtained from external computer-accessible databases that store available information (e.g., articles, press releases, etc. identifying a company's or competitors capabilities, solutions, etc.), that may be available publically or at a source from which the proposer has access. For example, portions of the evidence passage generation information 410 may be obtained via APIs and computing networks from the external computer-accessible databases.

In embodiments, the evidence passage generation information 410 may include unstructured information which may be structured by parsing, tagging, categorizing, segmenting, and/or curating the unstructured text using one or more computer-implemented text structuring techniques. For example, unstructured information may be structured based on structuring rules, category/tagging definitions, and/or other computer-interpretable information that the evidence passage generation component 406 may use to structure the unstructured information. The structured information may be stored in one or more databases (e.g., structured corpus 415) from which evidence passages may be generated. For example, as described in greater with respect to FIG. 5, the evidence passage generation component 406 may generate the structured corpus 415 based on the evidence passage generation information 410. In general, the evidence passage generation component 406 may access and search the structured corpus in order to generate evidence passages 430. In embodiments, the corpus 415 may also include partially structured and/or unstructured content.

As an illustrative, non-limiting example, the evidence passage generation information 410 may include the following example information in connection with a requirement for providing information technology (IT) migration services (e.g., as input by personnel of a proposal writing team and/or from external databases):

Information regarding the proposer's methodologies for supporting a suite of tools to enable clients to move beyond platform consolidation and virtualization into 'fit-for-purpose' platforms and delivery models, leading to further improvements in efficiency and effectiveness of the IT environment.

Information regarding the proposer's migration cycle time showing that cycle time can be reduced from months to days, with potential return on investment (ROI) in six to 18 months.

Information identifying that a shared global resource pool across several contracts and agencies can realize increased efficiency using standardized, automated execution, thus leveraging economies of scale. Additional tools can aid in cloud migration, such as automation for provisioning, migration, porting, and image import.

Information identifying the degree to which the proposers' proposed migration support services meet the requirements identified in the customer's proposal request document.

Information identifying the degree to which the proposers' proposed migration support services approach describe the capability and experiences to migrate various IT assets (e.g., virtual servers, custom and commercial-based applications, data, etc.) to operating environments.

Information identifying that the proposer is a leader in Data Center transformational services (e.g., to provide customers with the skills and track record needed for successful infrastructure migration and consolidation).

Information regarding substantiation, including the proposer's own internal data center consolidation efforts, the results from those efforts.

Information regarding the proposer's benefits, (e.g., reduction in floor space usage, cost reduction, savings in energy, and migration efficiency compared with prior migrations.)

As further shown in FIG. 4, the evidence passage generation component 406 may receive hypotheses queries 420. Each hypothesis query identifies evaluation criteria against which a proposer's response to the customer's proposal request may be evaluated. As an example, the hypothesis query may include a query of the proposer's ability to migrate the customer's IT assets.

As further shown in FIG. 4, the evidence passage generation component 406 may output evidence passages 430 based on the evidence passage generation information 410, the structured corpus 415, and the hypothesis queries 420. As described herein, the evidence passage generation component 406 may generate an evidence passage 430 indicating evidence of compliance by matching the proposer's capabilities (from the evidence passage generation information 410) with particular evaluation criteria (identified from a hypothesis query 420). Further, the evidence passage generation component 406 may generate an evidence passage 430 having evidence of relevance by identifying customer-specific information associated with the particular evaluation criteria (e.g., based on the writing guidelines and/or the customer requirements information from the evidence passage generation information 410). Additionally, or alternatively, the evidence passage generation component 406 may generate an evidence passage 430 having evidence of differentiation by analyzing the differences between expected customer solutions and proposer solutions (e.g., from the proposed solution information and the industry information from evidence passage generation information 410).

Additionally, or alternatively, the evidence passage generation component 406 may generate an evidence passage 430 having evidence of substantiation by matching the proposer's prior solutions (from the proposed solution information of the evidence passage generation information 410) with the particular evaluation criteria. The evidence passage 430 having evidence of substantiation may also include information indicating that the proposer has the sufficient resources required to satisfy the particular evaluation criteria (e.g., time, labor, financial, subject matter expertise, and/or other resources). Additionally, or alternatively, the evidence passage generation component 406 may generate an evidence passage 430 having evidence of competitive by matching the proposer's pricing information of proposed solutions (from the proposed solution information of the evidence passage generation information 410) with pricing information of competitor solutions (e.g., from the industry information of the evidence passage generation information 410). Additional details regarding the generation of evidence passages is provided in greater detail with respect to FIG. 6.

As described herein, the evidence passage generation component 406 may form evidence passages 430 having a narrative that addresses evaluation criteria by searching a structured corpus 415 that is generated based on the evidence passage generation information 410. In the above non-limiting example, the evidence passage generation component 406 may search the structured corpus 415 for solutions regarding the migration of IT assets. Further, the evidence passage generation component 406 may search the structured corpus 415 for customer-specific language and writing styles in order to form a narrative that is best suited for the customer. Further, the evidence passage generation component 406 may search the structured corpus 415 to identify competitor solutions regarding the migration of IT assets, may compare differences between the proposer's solutions and the competitor solutions, and generate an evidence passage that addresses the differences. In embodiments, the evidence passage generation component 406 may access the structured corpus 415 using an application programming interface (API). As described herein, the structured corpus 415 may be periodically updated based on updated evidence passage generation information 410. In this way, evidence passages 430 may be generated based on up-to-date evidence passage generation information 410.

Further, the structured corpus 415 may include a computer-generated and computer-accessible database that includes the culmination of information from various external computer-accessible databases. Further, periodic updating of the structured corpus 415 may be based on receiving computer-generated notifications of updated evidence passage generation information 410.

As an illustrative, non-limiting example, the evidence passage generation component 406 may generate evidence passages enabling a proposal author (or other automation) to construct example narrative based on a hypothesis query regarding the proposer's ability to migrate the customer's IT assets, and based on the example evidence passage generation information 410 discussed above: "To support the full migration life cycle from legacy data centers to new operating environments, we use a methodology-based migration support services approach, proven over thousands of engagements. Our approach first assesses your current environment, and then conducts migration analysis to identify the proper target environment. We then develop the Migration Project Plan, which documents our approach and provides a schedule for the targeted migrations."

In the above example, the evidence passage generation component 406 may generate the evidence passages 430 by searching the structured corpus 415 for proposer solutions relating to particular evaluation criteria (e.g., the migration of IT assets). Further, the evidence passage generation component 406 may generate the evidence passages 430 by searching the structured corpus 415 for customer-specific information (e.g., customer-specific writing styles, preferences, products, acronyms, jargon, etc.), and producing the evidence passage in accordance with the customer-specific information. Additionally, or alternatively, the evidence passage generation component 406 may generate the evidence passages 430 by searching the structured corpus 415 for competitor solutions to the migration of IT assets, and identifying differences between the proposer's solutions, and competitor solutions. Additionally, or alternatively, the evidence passage generation component 406 may generate the evidence passages 430 by searching the structured corpus 415 pricing differences between the proposer's solution and competitor's solution. In embodiments, the evidence passage generation component 406 may utilize any number of database, text, and/or other computer-based search techniques to search the structured corpus 415 in an expeditious manner.

Figure 5:
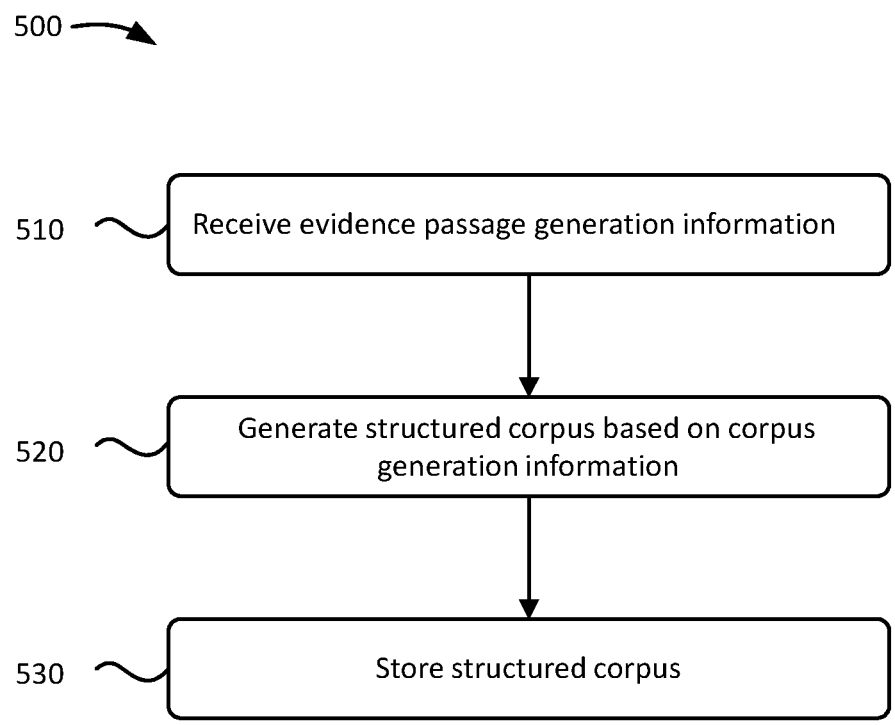
FIG. 5 shows an example flowchart for generating, maintaining, and updating a database or corpus from which evidence passages may be generated in accordance with aspects of the present invention.

FIG. 5 shows an example flowchart for generating, maintaining, and updating a database or corpus form which evidence passages may be generated in accordance with aspects of the present invention. The steps of FIG. 5 may be implemented in the environment of FIG. 4, for example, and are described using reference numbers of elements depicted in FIG. 4. As noted above, the flowchart illustrates the architecture, functionality, and operation of possible (but not limited to) implementations of systems, methods, and computer program products according to various embodiments of the present invention.

As shown in FIG. 5, process 500 may include receiving evidence passage generation information (step 510). For example, the evidence passage generation component 406 may receive the evidence passage generation information, which may include information similar to the evidence passage generation information 410 as described in FIG. 4. As described herein, portions of the evidence passage generation information may be manually entered by personnel of a proposer. Additionally, or alternatively, portions of the evidence passage generation information may be obtained from external databases that store publically available information (e.g., articles, press releases, etc. identifying a company's or competitors capabilities, solutions, writing guidelines, industry information, customer-specific information, etc.). Also, the evidence passage generation information 410 may include unstructured, partially structured, for fully structured text.

Process 500 may further include generating a structured corpus based on the evidence passage generation information (step 520). For example, the evidence passage generation component 406 may parse, tag, categorize, and/or further process the evidence passage generation information to generate a structured corpus. In embodiments, unstructured information may be structured using one or more computer-implemented information structuring techniques. More specifically, the evidence passage generation component 406 may structure the unstructured information based on structuring rules, category/tagging definitions, and/or other computer-interpretable structuring guideline information. As an example, the evidence passage generation information may be structured, categorized, and tagged as customer-specific information (e.g., for customer knowledge harvesting), proposer capability information, industry information, and/or other type of category or tag. As described herein, the structured corpus may be searched via computer-implemented search techniques with search queries to identify supporting information used to generate evidence passages. For example, the structured corpus may be searched to identify customer-specific information, proposer capability information, etc. for generating evidence passages.

Process 500 may also include storing the structured corpus (step 530). For example, the evidence passage generation component 406 may store the structured corpus such that the corpus may be searched and utilized when generating evidence passages. Process 500 may be repeated to update the structured corpus. In this way, evidence passages may be generated based on up-to-date evidence passage generation information.

Figure 6:
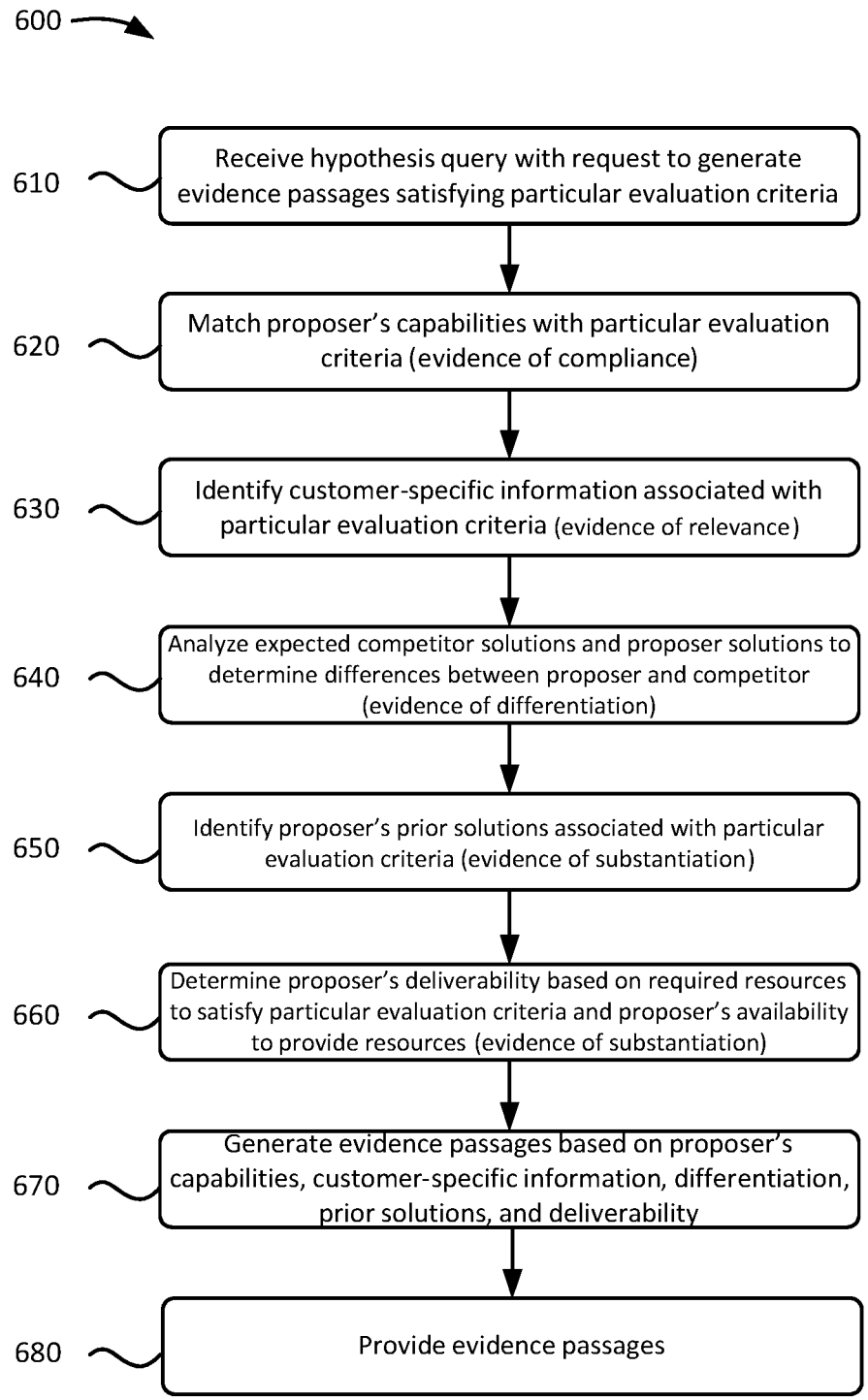
FIG. 6 shows an example flowchart for generating and providing evidence passages in accordance with aspects of the present invention.

FIG. 6 shows an example flowchart for generating and providing evidence passages in accordance with aspects of the present invention. The steps of FIG. 6 may be implemented in the environment of FIG. 4, for example, and are described using reference numbers of elements depicted in FIG. 4. As noted above, the flowchart illustrates the architecture, functionality, and operation of possible implementations of systems, methods, and computer program products according to various embodiments of the present invention.

As shown in FIG. 6, process 600 may include receiving a hypothesis query with a request to generate evidence passages satisfying particular evaluation criteria presented in a customer's proposal request (step 610). For example, the evidence passage generation component 406 may receive the hypothesis query via a user interface from a user (e.g., a proposal writer or other user). As an example, the particular evaluation criteria may relate to the proposer's ability to provide the migration of IT assets.

At step 620, the evidence passage generation component 406 may match the proposer's capabilities with particular evaluation criteria (e.g., to provide evidence of compliance with the customer's proposal request). In the above example, the evidence passage generation component 406 may search the structured corpus 415 for solutions regarding the migration of IT assets. For example, the evidence passage generation component 406 may search information categorized as proposer capabilities and may search with a search query including the particular evaluation criteria. Results from the search may identify the proposer's capabilities (e.g., proposer's offered solutions and previously provided solutions) to comply with the evaluation criteria (e.g., the migration of IT assets).

At step 630, the evidence passage generation component 406 may identify customer-specific information associated with the particular evaluation criteria (e.g., to provide evidence of relevance to the customer's proposal request). For example, the evidence passage generation component 406 may search information categorized as customer-specific information in the structured corpus 415. Further the evidence passage generation component 406 may search for the particular evaluation criteria within the customer-specific category. Example customer-specific information may include customer writing styles, customer preferred services, gaps in customer systems, customer-specific acronyms, jargon, words and phrases of interest, etc.

At step 640, the evidence passage generation component 406 may analyze expected competitor solutions and proposer solutions to determine differences between the proposer and competitor (e.g., to provide evidence of differentiation). In embodiments, the evidence passage generation component 406 may search information categorized as competitor solutions within the structured corpus 415. Further, the evidence passage generation component 406 may search for competitor the particular evaluation criteria within the competitor solutions category (e.g. competitor solutions to the migration of IT assets). The evidence passage generation component 406 may compare the competitor solutions with the proposer's solutions in order to generate an evidence passage with evidence of differentiation.

At step 650, the evidence passage generation component 406 may identify the proposer's prior solutions associated with the particular evaluation criteria (e.g., to provide evidence of substantiation). For example, the evidence passage generation component 406 may search for the particular evaluation criteria in the prior solutions category of the structured corpus 415.

At step 660, the evidence passage generation component 406 may determine the proposer's deliverability based on required resources to satisfy the particular evaluation criteria and the proposer's availability to provide the resources (e.g., to provide further evidence of substantiation). For example, the evidence passage generation component 406 may search the structured corpus 415 for information indicating the required resources to satisfy the particular evaluation criteria. In embodiments, the evidence passage generation component 406 may calculate the resources (e.g., time, labor, money, subject matter expertise, etc.) needed to satisfy the particular evaluation criteria based on historical information for resources previously needed to satisfy the particular evaluation criteria. Additionally, or alternatively, the evidence passage generation component 406 may calculate the resources needed to satisfy the particular evaluation criteria based on a formula and/or other information. In evidence passage generation component 406 may determine the available resources based on a resource availability matrix of the proposer and/or other resource availability information.

At step 670, the evidence passage generation component 406 may generate evidence passages based on the proposer's capabilities, customer-specific information, differentiation, proposer and competitor prior solutions, and deliverability. As described herein, the evidence passages may include narratives that a proposer's ability to satisfy the evaluation criteria. Further, the evidence passages may include narratives that provide evidence of compliance (e.g., the proposer's solution aligns with the customer's requirements), evidence of relevance (e.g., the proposer's solutions are communicated with customer-specific language and other customer-specific information), evidence of differentiation (e.g., the proposer's solution is different from the solutions of competitors), evidence of substantiation (e.g., the proposer has the resources and expertise to provide the solutions as demonstrated by the proposer's previous solutions), and evidence of competitive pricing (e.g., the proposer's pricing is competitive with the pricing of competitor solutions). In embodiments, the evidence passages may additionally or alternatively include other content, such as images with text, graphs, charts, figures, and/or process diagrams, etc. For example, an evidence passage may include a figure, graph, or chart that illustrates evidence of compliance, relevance, differentiation, substantiation, and/or competitive pricing.

At step 680, the evidence passage generation component 406 may output the evidence passages (e.g., on a display or in some other format). In embodiments, the evidence passage generation component 406 may output the evidence passages as an electronic document that can be modified by a user (e.g., a proposal writer) via a software programming running on a user device via a user interface. In embodiments, the evidence passages may aid a proposal writer in generating a proposal, using those passages as a reference when authoring original proposal content. In embodiments, the evidence passages may be used verbatim, or may be modified as the proposal writer sees fit. For example, the proposal writer may modify the electronic document via a user interface and via electronic document editing tools.

As described herein, the steps of FIG. 6 are not limited to the order shown. For example, certain steps of FIG. 6 may occur in parallel or in a different order. In embodiments, steps 630, 640, and/or 650 may occur in parallel. In other words, step 630 may not necessarily be a prerequisite for step 640, and step 640 may not necessarily be a prerequisite for step 650. In embodiments, one or more steps of FIG. 6 may be combined into a single step (e.g., step 650 and step 660 may be merged into a single step, or may be performed separately or in parallel). In embodiments, a single step may be divided into multiple steps.

As described herein, the latest evidence passage and evidence passage generation information is automatically updated and used to generate evidence passages that provide evidence of compliance, relevance, differentiation, substantiation, and/or price competitiveness. Further, information from computer-accessible databases are categorized, parsed, tagged, and stored in a corpus such that the corpus can be searched via computer searching, mapping, and comparison techniques. Additionally, APIs are used to access the corpus for searching and evidence passage generation. Further, the corpus and/or external databases storing evidence passage generation information may be cloud-based and remotely accessible.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:

receiving, by a computing device, evidence passage generation information, the evidence passage generation information including information obtained from a database that stores publicly available information;

generating, by the computing device, a computer-accessible corpus including the evidence passage generation information, the generating including structuring unstructured information by tagging the unstructured information as customer-specific information;

storing, by the computing device, the corpus;

automatically generating, by the computing device, evidence passages that support a proposer's response to a customer's proposal request, wherein the evidence passages include a narrative identifying the proposer's capabilities to satisfy evaluation criteria in the proposal request, wherein the narrative is based on customer-specific information including jargon, and wherein the generating includes accessing and searching the corpus via an application programming interface (API);

matching, by the computer device, the proposer's capabilities with the evaluation criteria to provide evidence of compliance with the customer's proposal request;

identifying, by the computer device, customer-specific information associated with the evaluation criteria to provide evidence of relevance to the customer's proposal request;

analyzing, by the computer device, expected competitor solutions and proposer solutions to determine differences between the proposer and competitor to provide evidence of differentiation;

identifying, by the computer device, the proposer's prior solutions associated with the evaluation criteria to provide evidence of substantiation;

determining, by the computer device, the proposer's deliverability based on required resources to satisfy the evaluation criteria and the proposer's availability to provide the resources to provide further evidence of substantiation; and outputting, by the computing device, the evidence passages as an electronic document that is editable via software running on a user device via a user interface.

2. The method of claim 1, further comprising receiving a hypotheses query that identifies the evaluation criteria, the hypothesis query being received via a user interface from the proposer.

3. The method of claim 1, wherein the computer-accessible corpus includes structured text, partially structured text, or unstructured content.

4. The method of claim 1, wherein the customer-specific information includes customer-specific writing styles.

5. The method of claim 1, further comprising matching, by the computing device, the proposer's availability of resources with the evaluation criteria.

6. The method of claim 5, further comprising identifying in the corpus, by the computing device, information indicating resources required to satisfy the evaluation criteria, the resources including subject matter expertise.

7. The method of claim 6, further comprising identifying in the corpus, by the computing device, evidence of price competitiveness.

8. The method of claim 1, wherein the computer-accessible corpus is periodically updated with at least one of:
customer requirements; and
customer information.

9. The method of claim 1, wherein a service provider at least one of creates, maintains, deploys and supports the computing device.

10. The method of claim 1, wherein steps of claim 1 are provided by a service provider on a subscription, advertising, and/or fee basis.

11. The method of claim 1, wherein the computing device includes software provided as a service in a cloud environment.

12. The method of claim 1, further comprising deploying a system for generating the evidence passages, comprising providing a computer infrastructure operable to perform the steps of claim 1.

13. The method of claim 1, further comprising generating, by the computing device, one of the evidence passages by determining a deliverability of the proposer based on required resources to satisfy the evaluation criteria and an availability of the proposer to provide the required resources, and determining, by the computing device, the availability of the proposer to provide the required resources based on a resource availability matrix of the proposer.

14. The method of claim 1, wherein the evidence passages are automatically generated based on: the proposer's capabilities; the identified customer-specific information; the determined differences; the identified prior solutions; and the determined deliverability.

15. A computer program product for generating evidence passages, the computer program product comprising a computer readable storage medium having program instructions embodied therewith, the program instructions executable by a computing device to cause the computing device to:

receive evidence passage generation information, the evidence passage generation information including information obtained from a database that stores publicly available information;

generate a computer-accessible corpus including the evidence passage generation information, the generating including structuring unstructured information by tagging the unstructured information as customer-specific information;

store the corpus;

access and search the corpus via an application programming interface (API);

automatically generate evidence passages that support a proposer's response to a customer's proposal request based on accessing and searching the corpus, the evidence passages including a narrative identifying the proposer's capabilities to satisfy evaluation criteria in the proposal request, and the narrative being based on customer-specific information including jargon;

match the proposer's capabilities with the evaluation criteria to provide evidence of compliance with the customer's proposal request;

identify customer-specific information associated with the evaluation criteria to provide evidence of relevance to the customer's proposal request;

analyze expected competitor solutions and proposer solutions to determine differences between the proposer and competitor to provide evidence of differentiation;

identify the proposer's prior solutions associated with the evaluation criteria to provide evidence of substantiation;

determine the proposer's deliverability based on required resources to satisfy the evaluation criteria and the proposer's availability to provide the resources to provide further evidence of substantiation; and output the evidence passages as an electronic document that is editable via software running on a user device via a user interface, wherein the evidence passages include a narrative identifying differences between the proposer's solutions to satisfy evaluation criteria in the proposal request and a competitor's expected solutions, the narrative being based on customer-specific information.

16. The computer program product of claim 15, wherein the program instructions further cause the computing device to receive a hypotheses query that identifies the evaluation criteria.

17. The computer program product of claim 15, wherein the computer-accessible corpus includes structured text, partially structured content, or unstructured content.

18. The computer program product of claim 15, wherein the narrative further identifies evidence of substantiation including the proposer's availability of resources to satisfy the evaluation criteria.

19. The computer program product of claim 15, wherein the evidence passages are automatically generated based on: the proposer's capabilities; the identified customer-specific information; the determined differences; the identified prior solutions; and the determined deliverability.

* * * * *